US011721860B2

(12) United States Patent
Xiao et al.

(10) Patent No.: US 11,721,860 B2
(45) Date of Patent: Aug. 8, 2023

(54) FLAME-RETARDANT COMPOSITIONS FOR ENERGY STORAGE DEVICES, METHODS OF MANUFACTURE THEREOF AND BATTERIES CONTAINING THE SAME

(71) Applicant: GM Global Technology Operations LLC, Detroit, MI (US)

(72) Inventors: Xingcheng Xiao, Troy, MI (US); Mei Cai, Bloomfield Hills, MI (US); Anne M. Dailly, West Bloomfield, MI (US); Prabjot Nanua, Ann Arbor, MI (US); Julian Sherborne, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 188 days.

(21) Appl. No.: 17/396,208

(22) Filed: Aug. 6, 2021

(65) Prior Publication Data

US 2023/0059036 A1      Feb. 23, 2023

(51) Int. Cl.
| | | |
|---|---|---|
| *H01M 4/02* | (2006.01) | |
| *H01M 50/143* | (2021.01) | |
| *C09K 21/02* | (2006.01) | |
| *H01M 50/204* | (2021.01) | |
| *C09K 21/10* | (2006.01) | |
| *C09K 21/12* | (2006.01) | |

(52) U.S. Cl.
CPC .......... *H01M 50/143* (2021.01); *C09K 21/02* (2013.01); *C09K 21/10* (2013.01); *C09K 21/12* (2013.01); *H01M 50/204* (2021.01)

(58) Field of Classification Search
CPC ....................................................... H01M 4/02
See application file for complete search history.

(56) References Cited

U.S. PATENT DOCUMENTS

| | | | |
|---|---|---|---|
| 6,015,510 A | 1/2000 | Jacobson et al. | |
| 6,025,419 A | 2/2000 | Kasowski et al. | |
| 2018/0114965 A1* | 4/2018 | Doyle ................. | H01M 50/394 |
| 2022/0200039 A1 | 6/2022 | Xiao et al. | |

* cited by examiner

*Primary Examiner* — Jacob B Marks
(74) *Attorney, Agent, or Firm* — Cantor Colburn LLP

(57) ABSTRACT

A battery module comprises a plurality of secondary battery cells arranged side-by-side; and a flame-retardant composition disposed atop the plurality of secondary battery cells; where the flame-retardant composition comprises a first composition and a second composition. The first composition comprises porous particles upon which are disposed a first metal catalyst particle and a first flame-retardant particle. The second composition comprises a fibrous composition that comprises a fibrous substrate upon which is disposed a second metal catalyst particle and a second flame-retardant particle.

20 Claims, 2 Drawing Sheets

FLAME-RETARDANT COMPOSITIONS FOR ENERGY STORAGE DEVICES, METHODS OF MANUFACTURE THEREOF AND BATTERIES CONTAINING THE SAME

BACKGROUND

This disclosure relates to flame-retardant compositions for energy storage devices, methods of manufacture thereof and articles comprising the same. In particular, this disclosure relates to flame-retardant compositions for batteries, methods of manufacture thereof and to battery modules and packs that contain the flame-retardant compositions.

A battery that comprises a plurality of assembled battery cells (e.g., secondary batteries) is used in various applications, such as, for example, portable electronic devices, electric bicycles, hybrid cars, electric cars, and the like. Since secondary battery cells store electric energy at a high density, they often generate abnormally high amounts of heat and gases that can result in an undesirable thermal event. This phenomenon often occurs when batteries are inadvertently short circuited or damaged.

In addition, when one of the battery cells in the assembled battery module experience an unfavorable thermal event, it may trigger a corresponding unfavorable event in an adjacent secondary battery cell. It is desirable to prevent such unfavorable events from occurring sequentially.

It is also desirable to provide flame-retardant materials that may be used in energy storage devices such as batteries, capacitors, ultracapacitors, and so on, that can increase the flame retardancy of the energy storage device.

SUMMARY

A flame-retardant composition for a battery module comprises a first composition and a second composition that are disposed atop a plurality of battery cells in the battery module. The first composition comprises porous particles upon which are disposed a first metal catalyst particle and a first flame-retardant particle. The second composition comprises a fibrous composition upon which is disposed a second metal catalyst particle and a second flame-retardant particle.

In one aspect, the first composition and the second composition are intimately mixed and added in a single layer to the battery module.

In another aspect, the first composition arranged in a first layer and the second composition arranged in a second layer; where the second layer is further away from the secondary battery cells than the first layer.

In another aspect, a first layer that comprises the first composition is disposed between two second layers each of which comprise the second composition.

In another aspect, a second layer that comprises the second composition is disposed between two first layers that comprise the first composition.

In another aspect, the first metal catalyst particle has a same chemical composition as the second metal catalyst particle.

In another aspect, the first metal catalyst particle has a different chemical composition as the second metal catalyst particle.

In another aspect, the first flame-retardant particle has a same chemical composition as the second flame-retardant particle.

In another aspect, the first metal catalyst particle and the second catalyst metal particle each comprise a transition metal.

In yet another aspect, the first metal catalyst particle and the second catalyst metal particle are independently selected from the group consisting of iron, nickel, cobalt, platinum, palladium, rhodium, tungsten, titanium, niobium, hafnium, vanadium, molybdenum, manganese, or a combination thereof.

In yet another aspect, the first flame retardant particle and the second flame retardant particle are independently selected from the group consisting of metal hydroxides, metal halides, phosphorus containing flame retardant, nitrogen containing flame retardants and a combination thereof.

In yet another aspect, the phosphorus containing flame retardant is an organophosphate ester and where the nitrogen containing flame retardant is a melamine.

In yet another aspect, the porous particles are selected from the group consisting of zeolites, aerogels, metal organic frameworks, fumed metal oxides, or a combination thereof.

A battery module comprises a plurality of secondary battery cells arranged side-by-side; and a flame-retardant composition disposed atop the plurality of secondary battery cells; where the flame-retardant composition comprises a first composition and a second composition. The first composition comprises porous particles upon which are disposed a first metal catalyst particle and a first flame-retardant particle. The second composition comprises a fibrous composition that comprises a fibrous substrate upon which is disposed a second metal catalyst particle and a second flame-retardant particle.

In an aspect, the first metal catalyst particle has a same chemical composition as the second metal catalyst particle.

In another aspect, the first metal catalyst particle has a different chemical composition as the second metal catalyst particle.

In yet another aspect, the first flame-retardant particle has a same chemical composition as the second flame-retardant particle.

In yet another aspect, the first metal catalyst particle and the second catalyst metal particle comprises a transition metal particle.

In yet another aspect, the metal catalyst particles, the flame retardant particles and porous particles are mixed with a polymeric binder to manufacture a slurry to fill in all the free space in the module.

The above features and advantages, and other features and advantages of the disclosure are readily apparent from the following detailed description when taken in connection with the accompanying drawings.

BRIEF DESCRIPTION OF THE FIGURES

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

Disclosed herein is a flame-retardant composition that is disposed in a battery module to increase the overall flame retardancy of the module and to minimize adverse thermal events such as, for example, a thermal runaway. The flame-retardant composition is disposed in the battery module and sits atop a plurality of battery cells that are contained in the battery module. In an embodiment, the flame-retardant composition is disposed in the battery module and sits atop a plurality of vertically aligned battery cells that are contained in the battery module.

The flame retardant composition comprises a fibrous substrate into which is disposed a slurry that comprises porous media, metal catalyst particles and flame retardant particles. The slurry may contain an optional polymeric binder. The slurry may be cast into the module so that it fills vacant spaces in the module. In another embodiment, the flame retardant composition comprises a fibrous substrate into which is infiltrated a slurry that comprises porous media, metal catalyst particles and flame retardant particles. In an embodiment, the flame retardant composition may be applied to the battery module in a single layer that sits atop the plurality of vertically aligned battery cells.

In another embodiment, the flame retardant composition may be used in the battery module in two or more layers—a first layer that comprises a first composition that contains a particulate flame-retardant composition and a second layer that comprises a second composition that contains a fibrous flame-retardant composition. The first composition of the first layer is a particulate composition that comprises porous media, a first metal catalyst particle and a first flame retardant particle while the second composition of the second layer is a fibrous composition that comprises a fibrous substrate, a second metal catalyst particle and a second flame retardant particle. The first metal catalyst particle may be the same or different from the second metal catalyst particle while the first flame retardant particle may be the same or different form the second flame retardant particle. In a preferred embodiment, the first metal catalyst particle is the same as the second metal catalyst particle and the first flame retardant particle is the same as the second flame retardant particle. The first and the second layers may be placed in the battery module in varying configurations that are discussed herein.

In yet another embodiment, the first and second compositions may be blended together into an intimate mixture and applied as a single layer to the battery module as detailed herein.

Figure 1:
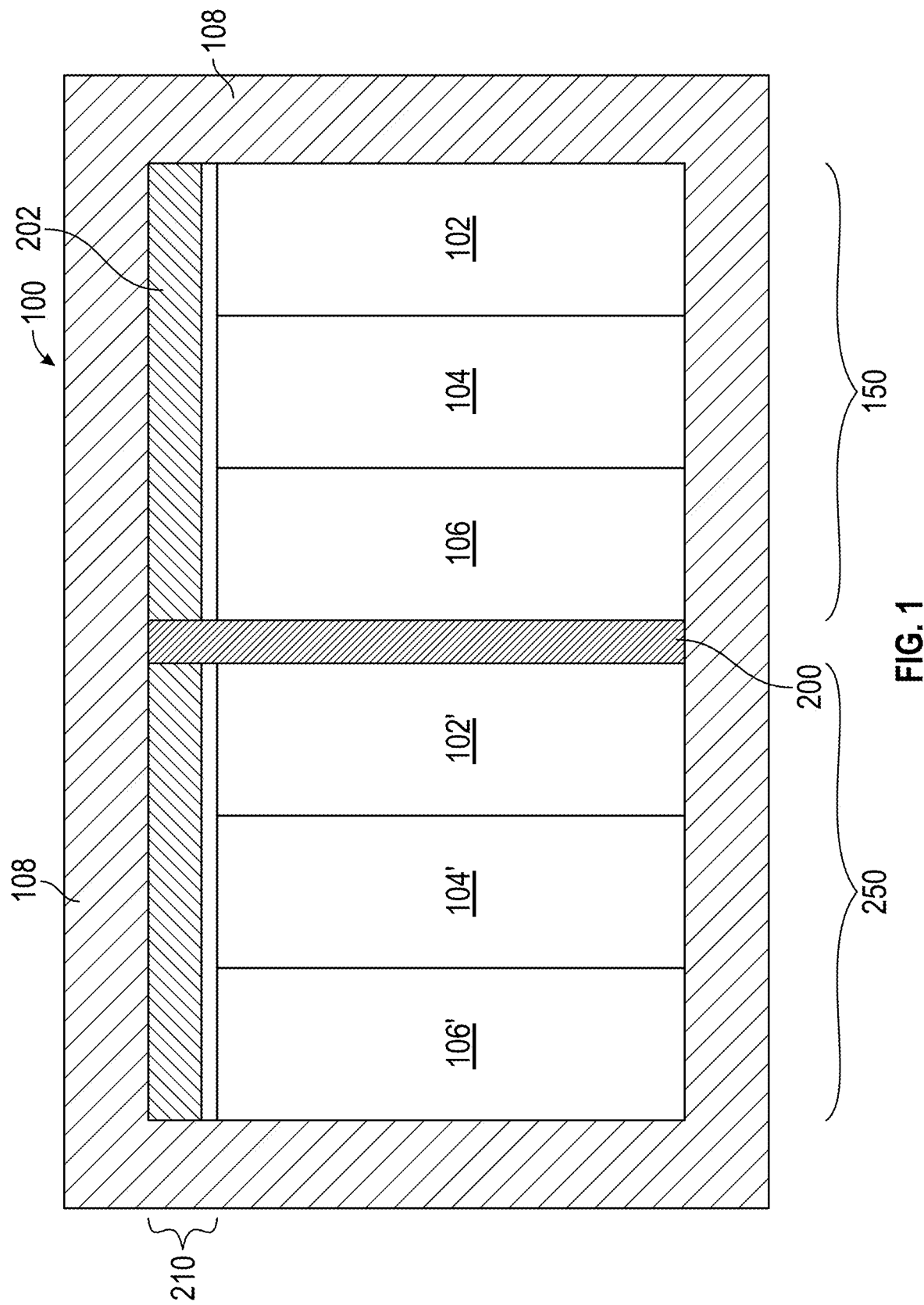
FIG. 1 is an exemplary schematic depiction of a cross-section of a battery module that comprises a plurality of secondary battery cells.

FIG. 1 is an exemplary schematic depiction of cross-section of battery module 100 that comprises a plurality of modules 150, 250, and so on arranged parallel to each other. Each module comprises a plurality of battery cells. For example, a first module 150 comprises battery cells 102, 104, 106, and so on, while the second module 250 comprises battery cells 102', 104', 106' and so on. The first module 150 is separated from the second module 250 by a barrier 200. The plurality of battery cells 102, 104, 106 . . . is encased in a protective shell 108. Atop the battery cells 102, 104, 106, and so on is a space 210 into which a flame retardant composition may be applied as a single layer or in multiple layers.

The Flame Retardant Composition Used in a Single Layer

As noted above, the flame retardant composition (when used in a single layer) comprises a fibrous substrate into which a slurry comprising a solvent, the porous media, metal catalyst particles and flame retardant particles is infiltrated.

The fibrous substrate comprises a fiber composition that is inherently non-flammable. The fibers in the fibrous composition preferably have an aspect ratio greater than 1, preferably greater than 5, and more preferably greater than 10. As used herein, "fibrous" includes fibers that may exist in the form of whiskers, needles, rods, tubes, strands, elongated platelets, lamellar platelets, ellipsoids, micro fibers, nanofibers and nanotubes, elongated fullerenes, and the like. Where such fillers exist in aggregate form, an aggregate having an aspect ratio greater than 1 will also suffice.

Non-limiting examples of suitable fibrous fillers include short inorganic fibers, including processed mineral fibers such as those derived from blends comprising at least one of aluminum silicates, aluminum oxides, magnesium oxides, and calcium sulfate hemihydrate, boron fibers, ceramic fibers such as silicon carbide, and fibers from mixed oxides of aluminum, boron and silicon sold under the trade name NEXTEL® by 3M Co., St. Paul, Minn., USA. Also included among the fibrous substrate are single crystal fibers or "whiskers" including silicon carbide, alumina, boron carbide, iron, nickel, copper. Fibrous substrates such as glass fibers, basalt fibers, including textile glass fibers and quartz may also be included.

Such reinforcing fillers may be provided in the form of monofilament or multifilament fibers and can be used either alone or in combination with other types of fiber, through for example, co-weaving or core/sheath, side-by-side, orange-type or matrix and fibril constructions, or by other methods known to one skilled in the art of fiber manufacture. Typical cowoven structures include glass fiber-carbon fiber, carbon fiber-aromatic polyimide (aramid) fiber, and aromatic polyimide fiber-glass fiber. Fibrous substrates that comprise glass may be supplied in the form of, for example, rovings, woven fibrous reinforcements, such as 0-90 degree fabrics, non-woven fibrous reinforcements such as continuous strand mat, chopped strand mat, tissues, papers and felts and 3-dimensionally woven reinforcements, performs and braids.

In a preferred embodiment, glass fibers are used as the fibrous substrate. Useful glass fibers can be formed from any type of fiberizable glass composition and include those prepared from fiberizable glass compositions commonly known as "E-glass," "A-glass," "C-glass," "D-glass," "R-glass," "S-glass," as well as E-glass derivatives that are fluorine-free and/or boron-free. Most reinforcement mats comprise glass fibers formed from E-glass.

Commercially produced glass fibers generally having nominal filament diameters of about 4.0 to about 35.0 micrometers, and most commonly produced E-glass fibers having nominal filament diameters of about 9.0 to about 30.0 micrometers may be used in the fibrous substrate.

The fibrous filaments of the fibrous substrate are made by standard processes (e.g., by steam or air blowing, flame blowing, and mechanical pulling). The preferred filaments for the fibrous substrate may be made by mechanical pulling. The glass fibers may be sized or unsized. Sized glass fibers are coated on at least a portion of their surfaces with a sizing composition that facilitates wet-out and wet-through of any matrix material disposed upon the fiber strands and assists in attaining desired physical properties in the composite.

The glass fibers are preferably glass strands that have been sized. In preparing the glass fibers, a number of filaments can be formed simultaneously, sized with the coating agent and then bundled into a strand. Alternatively the strand itself may be first formed of filaments and then sized. The amount of sizing employed is generally that amount which is sufficient to bind the glass filaments into a continuous strand and ranges from about 0.1 to about 5 wt %, and more typically ranges from about 0.1 to 2 wt % based on the weight of the glass fibers. Generally, this may be about 1.0 wt % based on the weight of the glass filament. Glass fibers in the form of chopped strands about one-fourth inch long or less and preferably about one-eighth inch long may also be used. They may also be longer than about one-fourth inch in length if desired.

In a preferred embodiment, the fibrous composition comprises glass fibers in the form of fiber glass. In general, the glass fibers are present in the flame-retardant composition in an amount of up to about 50 wt % based on the total weight of the composition, and preferably from about 1 to about 20 wt %, based on the total weight of the flame retardant composition.

Carbon fibers may also be used as the fibrous substrate in the flame retardant composition. Carbon fibers have several advantages including high stiffness, high tensile strength, low weight to strength ratio, high chemical resistance, high temperature tolerance and low thermal expansion. Precursors for carbon fibers are polyacrylonitrile (PAN), rayon and pitch. These precursors are first woven into a fiber filament yarn, which is then drawn under a tensile force at temperatures over 1000° C., preferably at temperatures over 1500° C., to form the carbon fibers.

The carbon fibers may also be treated with a sizing agent as detailed above. Fibrous substrates that comprise carbon fibers may also be supplied in the form of, for example, rovings, woven fibrous reinforcements, such as 0-90 degree fabrics, non-woven fibrous reinforcements such as continuous strand mat, chopped strand mat, tissues, papers and felts and 3-dimensionally woven reinforcements, performs and braids.

The glass fibers are present in the flame-retardant composition in an amount of up to about 50 wt % based on the total weight of the composition, and preferably from about 1 to about 20 wt %, based on the total weight of the flame retardant composition.

Porous Media

The flame retardant composition comprises a porous media (hereinafter porous particles) which may be added to the composition by itself or which alternatively is added to the composition with first flame-retardant and a first metal catalyst (hereinafter first metal catalyst particles) disposed upon the porous media. The porous particles can react with a substantial portion of the gases such as hydrogen and hydrocarbon gases generated initially in the battery during an unfavorable thermal event to terminate the combustion chain branching reaction and suppress the spread of the unfavorable thermal event.

In addition, the high specific surface area of the porous particles can adsorb the flammable gases. In one embodiment, the first metal catalyst particles can covert gases released during the thermal runway to produce carbonaceous particles thereby solidifying the hydrocarbon gases. The porous media (e.g., zeolite) will also catalyze carbon char formation. The carbon char undergoes intumescence due to a synergistic reaction between the zeolite, polymer components such as any binders used and the flame retardant chemicals such as ammonium phosphates. Intumescing increases flame retardancy.

Intumescence is the action or process of becoming enlarged or swollen and this act of swelling consumes some of the heat generated during an unfavorable thermal event thus mitigating the spreading of the unfavorable event. The particulate nature of the porous media permits it to fill in spaces and crevices in the module thus providing close contact with the battery cells. This close contact may facilitate a rapid abatement of an unfavorable thermal event in the module. Suitable examples of porous particles are zeolites, aerogels, fumed metal oxides, metallic organic frameworks (MoFs), or the like, or a combination thereof.

Zeolites

Zeolites are a form of molecular sieves that are microporous crystalline solids with well-defined structures and comprise silicon, aluminum and oxygen in their framework and may also comprise cations within their pores. The zeolites (like all of the porous media detailed herein) may be added to the flame retardant composition singly (without the metal catalyst particles or flame retardant particles added thereon) or may be added to the flame retardant with a portion of the metal catalyst particles and a portion of the flame retardant particles (from the flame retardant composition) disposed thereon.

The zeolites have a crystalline framework of interconnected alumina and silica, in particular, cross-linked alumina and silica via a sharing of oxygen atoms, and thus can be characterized by the silica-to-alumina ratio (SAR). In general, as a zeolite's SAR increases, the zeolite displays increased hydrothermal stability. A defining feature of a molecular sieve is its crystalline or pseudo-crystalline structure which is formed by molecular tetrahedral cells interconnected in a regular and/or repeating manner to form a framework.

Zeolites have a three-dimensional molecular framework that arises from the orientation of their interconnected cells. The cells of these molecular sieves typically have volumes on the order of a few cubic nanometers and cell openings (also referred to as "pores" or "apertures") on the order of a few angstroms in diameter. The cells are defined by the ring size of their pores, where, for example, the term "8-ring" refers to a closed loop that is built from 8 tetrahedrally coordinated silicon (or aluminum) atoms and 8 oxygen atoms. In certain zeolites, the cell pores are aligned within the framework to create one or more channels which extend through the framework, thus creating a mechanism to restrict the ingress or passage of different molecular or ionic species through the molecular sieve, based on the relative sizes of the channels and molecular or ionic species.

This feature is useful because the zeolites (used as substrates) may be sized to permit certain combustible gases generated during a thermal event to enter its pores (and be deprived of oxygen) while certain other gases (that may not be combustible) are excluded from entering the porous substrate. This feature can minimize the sequential spreading of a thermal event from one battery cell to an adjacent one and thus improves flame retardancy. The size and shape of zeolite pores thus affect its catalytic activity because they exert a steric influence on the reactants, controlling the access of reactants and products.

Molecular sieves having a small pore framework (i.e., containing a maximum ring size of 8) have been found to be particularly useful in SCR applications. Small pore molecular sieves include those having the following crystalline structure types: CHA, LEV, ERI, and AEI. Specific aluminosilicates and silico-aluminophosphates examples of molecular sieves having the CHA framework include SAPO-34, AlPO-34, and SSZ-13.

Aerogels

Aerogels may also be used as porous particles which may be used singly (as defined above-without the metal catalyst particles or without the flame retardant particles) or alternatively with some or all of the catalyst metal particles and the flame-retardant particles disposed thereon. Aerogels are synthetic porous ultralight materials derived from a wet gel, in which the liquid component of the wet gel has been replaced with a gas without significant collapse of the gel structure. The result is a solid with extremely low density and extremely low thermal conductivity. Aerogels are good thermal insulators because they almost nullify two of the three methods of heat transfer—conduction (they are mostly composed of insulating gas) and convection (the microstructure prevents net gas movement). They are good conductive insulators because they are composed almost entirely of gases, which are very poor heat conductors. They are good convective inhibitors because air cannot circulate through the lattice.

Inorganic and organic aerogels may also be used as porous particles. Inorganic aerogels include silica aerogels, alumina aerogels, nickel-alumina aerogels, holmia aerogels, iron oxide aerogels, erbia aerogels, chromia aerogels, samaria aerogels, vanadia aerogels, neodymium oxide aerogels, or a combination thereof. The aerogels may be surface treated with surface treatments such as hexamethyldisilazane, trichloromethylsilane, and the like, which prevent moisture ingress into the porous particles.

Organic aerogel particles may include those obtained from biopolymers as well as those obtained from synthetic organic polymers.

Examples of biopolymers that may be used in the aerogels include cellulose, reduced crystallinity cellulose, polysaccharides, chitosan, oligochitosan, gelatin, collagen, hydroxyalkyl celluloses such as hydroxypropyl cellulose, hydroxymethyl cellulose and hydroxyethyl cellulose; sodium carboxymethyl cellulose, cellulose acetate, cellulose diacetate, cellulose triacetate, cellulose propionate, cellulose acetate butyrate, and cellulose ethers like ethyl cellulose, sugars (glucose, sucrose, lactose, galactose, fructose, mannitol, sorbitol, or a combination thereof), proteins, starch, pectin, alginate, starch sodium octenyl succinate, locust bean gum, carrageenan, agar, xanthan gum, guar gum, casein, whey protein isolate, soy protein isolate, pea protein isolate, potato protein isolate, zein, lecithin, stearic acid, beeswax, cottonseed wax, carnauba wax, milk fat, palm and palm kernel oil, or the like, or a combination thereof.

Synthetic polymers can also be used in the aerogels. The synthetic polymers are organic polymers and may be selected from a wide variety of thermoplastic polymers, blends of thermoplastic polymers, thermosetting polymers, or blends of thermoplastic polymers with thermosetting polymers. The organic polymer may also be a blend of polymers, copolymers, terpolymers, or combinations comprising at least one of the foregoing organic polymers. The organic polymer can also be an oligomer, a homopolymer, a copolymer, a block copolymer, an alternating block copolymer, a random polymer, a random copolymer, a random block copolymer, a graft copolymer, a star block copolymer, a dendrimer, a polyelectrolyte (polymers that have some repeat groups that contain electrolytes), a polyampholyte (a polyelectrolyte having both cationic and anionic repeat groups), an ionomer, or the like, or a combination thereof. The organic polymers have number average molecular weights greater than 10,000 grams per mole, preferably greater than 20,000 g/mole and more preferably greater than 50,000 g/mole.

Examples of thermoplastic polymers that can be used in the polymeric material include polyacetals, polyacrylics, polycarbonates, polyalkyds, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether ether ketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polyethylene terephthalates, polyvinylidene fluorides, polysiloxanes, or the like, or a combination thereof.

Examples of thermosetting polymers include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, resorcinol formaldehyde, phenol formaldehyde, melamine formaldehyde, cresol formaldehyde, phenol furfuryl alcohol, or the like, or a combination thereof. The biopolymer aerogels are preferred. Alginate based aerogels are preferred amongst the biopolymers.

The aerogels may be manufactured using supercritical extraction, freeze drying or a combination thereof.

Fumed Metal Oxides

Fumed metal oxides which are in the form of porous agglomerates of nanoparticles, are effective as thermally conductive solid components and can be used as porous particles in the first composition of the flame-retardant composition. Examples of fumed metal oxides are fumed silica, fumed alumina, fumed zirconia, fumed titania, or a combination thereof.

The porous particle has a high surface area and has a porosity of greater than 50% volume percent, preferably greater than 70 volume percent, and more preferably greater than 90 volume percent, based on the total volume of the porous substrate prior to impregnation with a transition metal precursor (detailed below) and the flame-retardant compound (detailed below).

The average pore sizes in the porous particle can be 5 Angstroms to 100 micrometers (μm), preferably 100 nanometers (nm) to 50 micrometers, and more preferably 150 nanometers to 20 micrometers. It is desirable for the porous substrate to contain a higher volume percentage of micrometer sized pores compared to the volume percentage of nanometer sized pores. This prevents the porous substrate from collapsing due to the collapse of the pores by virtue of capillary pressure when exposed to liquids (e.g., moisture, battery acid, and the like).

The porous particle can have a unimodal, bimodal or multimodal particle size distribution. Multimodal particle size distributions are preferred since these permit better packing of the particles of the first composition. The porous particles can have average particle sizes of 2 nanometers to 1000 micrometers, preferably 10 nanometers to 100 micrometers, and more preferably 50 to 10 micrometers.

Metal Organic Frameworks

Metal-organic frameworks (MOFs) are the fastest growing class of materials in chemistry today. They consist of interchangeable metal-containing nodes and carbon-based struts. There are more than 15,000 MOFs on record at the Cambridge Crystallographic Data Centre so the pool of materials to choose from is quite big.

MOFs have specific surface areas and micropore volumes that can exceed that of traditional adsorbents such as zeolites and activated carbons. MOFs are hybrid inorganic-organic frameworks that are assembled by the connection of Secondary Building Blocks (SBU), usually consisting of metal ions or clusters, through rigid organic ligands. The variety of cations and molecular bridges which can be combined in the framework yields an extended range of materials with diverse pore sizes and functionalities.

To successfully design adsorbents, it is necessary to have a full understanding of the adsorbent' structure including pore size/shape as well as the adsorbate properties. The adsorbates adhere to the surface by weak attractive interactions known as van der Waals forces. Adsorption occurs in pores whose diameter is close to twice the molecular diameter of the molecule being adsorbed which is why pore size distribution within the adsorbent is a determining factor. MOFs that exist so far can adsorb molecules of large micropores or even mesoporous range. Per IUPAC nomenclature microporous defined as pores smaller than 2 nm in diameter and mesoporous as pores with diameters between 2 and 50 nm. Pores sizes to be selected to provide easy diffusion paths for the adsorbate molecules to be desorbed from and diffuse out of the pore network.

Another material characteristic which may affect the adsorbate adsorption uptake is the presence of open metal sites so to some extent MOFs chemistry/functionality.

In some MOFs metal centers are bonded in specific coordination environment leaving the cation in the center open and accessible to the adsorbed gas molecules. Unsaturated metal sites have been shown to enhance certain adsorbate affinities compared to non-open metals.

It is to be noted that combinations of metal organic frameworks, zeolites, aerogels, fumed metal oxides, and the like can be used in combinations of two or more if desired.

The porous particles may be added to the flame retardant composition in an amount of 1 to 20 wt %, preferably 2 to 15 wt %, based on the total weight of the flame retardant composition.

Metal Catalyst Particles

Metal catalyst particles are used in the flame retardant composition and may be added separately to the flame retardant composition (without disposing them on the porous particles) or alternatively, may be dispersed on the porous particles and then added to the flame retardant composition.

When the flame retardant composition is added to the battery module in two layers, the metal catalyst particles may be added in a first composition to the first layer and in a second composition to the second layer. The metal catalyst particles in the first composition may be the same or "different" from those in the second composition. The term "different" implies a chemical difference—the chemistry of the metal particles in the first composition is different from the chemistry of the metal particles in the second composition.

The metal catalyst particles function to catalyze carbonaceous gases that are produced in the battery module during the thermal runaway. When the battery heats up to temperatures that are undesirably high, gases are produced. These gases are typically carbonaceous gases (i.e., they contain hydrocarbons, carbon dioxide, carbon monoxide, or combinations thereof) and emanate from electrolytes that are used in the battery. These gases are flammable and toxic.

Metal particles can function as catalysts to convert these carbonaceous gases into carbonaceous solids such as carbon nanotubes, graphene, graphite particles, polyacetylene, or combinations thereof. In other words, they function to solidify the gases and reduce the undesirable effects of the gases. In addition, some of the solids formed can undergo intumescence (also sometimes referred to as exfoliation, particularly in the case of graphites) which promote flame retardance and facilitate suppression or delay of an unfavorable thermal event. It is to be noted that some of these carbonaceous gases enters into the pores of the porous particles where they are sequestered and prevented from combusting because of a lack of oxygen.

Suitable metal particles include transition metal particles such as iron, nickel, cobalt, gold, silver, platinum, palladium, rhodium, aluminum, magnesium, lead, copper, tungsten, titanium, niobium, hafnium, vanadium, copper, molybdenum, manganese, or the like, or a combination thereof. Preferred metal particles include iron, nickel, cobalt, or a combination thereof.

The metal particles may be disposed on the fibrous substrates or on the porous media by the reduction of salts such as chlorides, chlorates, sulfates, sulfides, nitrates, phosphates, or the like, of the metals listed above. The metal salts are dissolved in suitable solvents which are then blended with the porous particles to form a slurry. The slurry is then dried resulting in a deposition of the metal salt on the porous particles. The porous particles with the metal salt disposed thereon is then subjected to a reducing gaseous stream (e.g., hydrogen, helium, or the like) at elevated temperatures to reduce the salt to a metal.

The metal catalyst particles have average particle sizes of 2 nanometers to 50 micrometers, 10 nanometers to 25 micrometers, 50 nanometers to 15 micrometers. The size of the metal particles is dependent upon the concentration of salt relative to the porous particles in the slurry. A higher concentration of salt relative to the porous particles produces larger metal catalyst particle sizes after reduction.

The metal catalyst particles are generally present on the porous particles in an amount of 0.5 to 10 wt %, preferably 1 to 5 wt %, and more preferably 1.5 to 4 wt %, based on the total weight of the first composition.

Flame-Retardant Particles

The flame-retardant particles are present in the flame retardant composition (or alternatively in the first composition and the second composition when the flame retardant composition is added in two or more layers). The flame-retardant particles in the first composition may be the same or "different" from those in the second composition. The term "different" implies a chemical difference—the chemistry of the flame-retardant particles in the first composition is different from the chemistry of the flame-retardant particles in the second composition.

Examples of suitable flame-retardant particles are metal hydroxides, halogenated flame-retardants, phosphorus containing flame-retardants, nitrogen-containing flame-retardants, or the like, or a combination thereof.

Metal hydroxides act as flame-retardants by undergoing a reaction (with itself or with a metal oxide) to produce water in the presence of heat. The water may act to douse the flame or alternatively, surround the flammable material thus preventing oxygen from contacting the material and setting it aflame. In an embodiment, metal oxides may be used in conjunction with the metal hydroxides to function as flame-retardants. Examples of metal hydroxides are magnesium hydroxide, aluminum hydroxide, or a combination thereof. Examples of metal oxides are magnesium oxide, aluminum oxide, or a combination thereof.

In some embodiments, the phosphorus containing flame-retardant comprises an organophosphate ester. Exemplary organophosphate ester flame-retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), t-butylphenyl diphenyl phosphates (CAS Reg. No. 56803-37-3), bis(t-butylphenyl) phenyl phosphates (CAS Reg. No. 65652-41-7), tris(t-butylphenyl) phosphates (CAS Reg. No. 78-33-1), or the like, or a combination thereof.

In some embodiments the organophosphate ester comprises a bis-aryl phosphate having the formula:

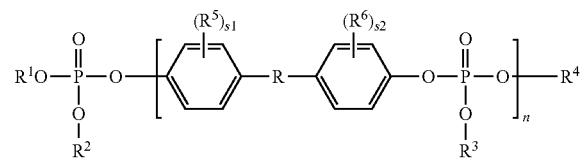

wherein R is independently at each occurrence a $C_1$-$C_{12}$ alkylene group; $R^5$ and $R^6$ are independently at each occurrence a $C_1$-$C_5$ alkyl group; $R^1$, $R^2$, and $R^4$ are independently a $C_1$-$C_{12}$ hydrocarbyl group; $R^3$ is independently at each occurrence a $C_1$-$C_{12}$ hydrocarbyl group; n is 1 to 25; and s1 and s2 are independently an integer equal to 0, 1, or 2. In some embodiments $OR^1$, $OR^2$, $OR^3$ and $OR^4$ are independently derived from phenol, a monoalkylphenol, a dialkylphenol, or a trialkylphenol.

As readily appreciated by one of ordinary skill in the art, the bis-aryl phosphate is derived from a bisphenol. Exemplary bisphenols include 2,2-bis(4-hydroxyphenyl)propane (bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In some embodiments, the bisphenol comprises bisphenol A.

In some embodiments, the flame-retardant comprises a metal dialkylphosphinate. As used herein, the term "metal dialkylphosphinate" refers to a salt comprising at least one metal cation and at least one dialkylphosphinate anion. In some embodiments, the metal dialkylphosphinate has the formula:

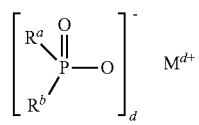

wherein $R^a$ and $R^b$ are each independently $C_1$-$C_6$ alkyl; M is calcium, magnesium, aluminum, or zinc; and d is 2 or 3.

Examples of $R^a$ and $R^b$ include methyl, ethyl, n-propyl, isopropyl, n-butyl, tert-butyl, and n-pentyl. In some embodiments, $R^a$ and $R^b$ are ethyl, M is aluminum, and d is 3 (that is, the metal dialkylphosphinate is aluminum tris(diethylphosphinate)).

In some embodiments, the flame-retardant comprises a nitrogen-containing flame-retardant. Nitrogen-containing flame-retardants include those comprising a nitrogen-containing heterocyclic base and a phosphate or pyrophosphate or polyphosphate acid. In some embodiments, the nitrogen-containing flame-retardant has the formula

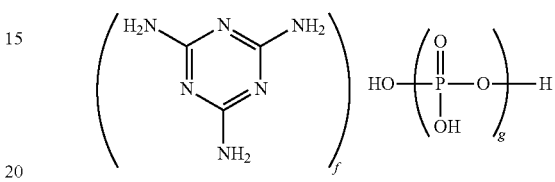

wherein g is 1 to 10,000, and the ratio of f to g is 0.5:1 to 1.7:1, specifically 0.7:1 to 1.3:1, more specifically 0.9:1 to 1.1:1. It will be understood that this formula includes species in which one or more protons are transferred from the phosphate group(s) to the melamine group(s). When g is 1, the nitrogen-containing flame-retardant is melamine phosphate (CAS Reg. No. 20208-95-1). When g is 2, the nitrogen-containing flame-retardant is melamine pyrophosphate (CAS Reg. No. 15541 60-3). When g is, on average, greater than 2, the nitrogen-containing flame-retardant is a melamine polyphosphate (CAS Reg. No. 56386-64-2). In some embodiments, the nitrogen-containing flame-retardant is melamine pyrophosphate, melamine polyphosphate, or a mixture thereof. In some embodiments in which the nitrogen-containing flame-retardant is melamine polyphosphate, g has an average value of greater than 2 to 10,000, specifically 5 to 1,000, more specifically 10 to 500. In some embodiments in which the nitrogen-containing flame-retardant is melamine polyphosphate, g has an average value of greater than 2 to 500. Methods for preparing melamine phosphate, melamine pyrophosphate, and melamine polyphosphate are known in the art, and all are commercially available. For example, melamine polyphosphates may be prepared by reacting polyphosphoric acid and melamine, as described, for example, in U.S. Pat. No. 6,025,419 to Kasowski et al., or by heating melamine pyrophosphate under nitrogen at 290° C. to constant weight, as described in U.S. Pat. No. 6,015,510 to Jacobson et al. In some embodiments, the nitrogen-containing flame-retardant comprises melamine cyanurate.

The nitrogen-containing flame-retardant can have a low volatility. For example, in some embodiments, the nitrogen-containing flame-retardant exhibits less than 1 percent weight loss by thermogravimetric analysis when heated at a rate of 20° C. per minute from 25 to 280° C., specifically 25 to 300° C., more specifically 25 to 320° C.

In some embodiments, the flame-retardant particles have an average particle size of 10 nanometers to 1000 micrometers, preferably 100 nanometers to 500 micrometers, and more preferably 200 to 20 micrometers.

The flame-retardant particles are generally present in the flame retardant composition in an amount of 0.5 to 20 wt %, preferably 1 to 10 wt %, and more preferably 1.5 to 8 wt %, based on the total weight of the flame retardant composition.

Manufacturing of the Flame Retardant Composition as a Single Layer

In order to manufacture the flame retardant composition, the porous particles, the metal catalyst particles and the flame-retardant particles are first mixed with a solvent to form a slurry. The slurry may contain a polymeric binder (where the polymers are selected from the list above). The fibrous substrate is then immersed into the slurry to permit the slurry to infiltrate the substrate. When the desirable amount of slurry has infiltrated the fibers, the fibrous substrate is dried to remove the solvent an any byproducts. The flame retardant composition containing the fibrous substrate, the porous media, the metal catalyst particles and the flame retardant particles is then added to the battery module in a single layer and disposed atop the battery cells as shown in the FIG. 1 (see first layer 202 in FIG. 1).

Optionally, the slurry after mixing with the fibrous substrate (and still in slurry form) may be poured into the module to fill in any spaces (in the module) that are unoccupied.

It is to be noted that the metal catalyst particles may be added in the form of a metal salt precursor to form the slurry. The metal catalyst particles are obtained by reducing the metal salt to leave behind the metal catalyst particles. An exemplary reducing agent is hydrogen.

Manufacturing of the Flame Retardant Composition in Two Layers

When the flame retardant composition is added in two layers, then the slurry contains only the metal catalyst particles and the flame retardant particles. The slurry is added to the fibrous substrate to form the first composition and then separately added to the porous particles to form the second composition. Each of the respective compositions is then dried to remove solvents and any reaction precursors and by-products. The compositions may be blended together and added as a single layer as detailed above, or alternatively, added in two separate layers as detailed below.

The first composition is added to the battery module as the first layer, while the second composition is disposed atop the first layer in the battery module. Both the first layer and the second layer are disposed between the battery casing and the battery cells as shown in the FIG. 2. In an embodiment, there may be multiple layers containing the first composition and the second composition each of which alternate with one another.

Figure 2:
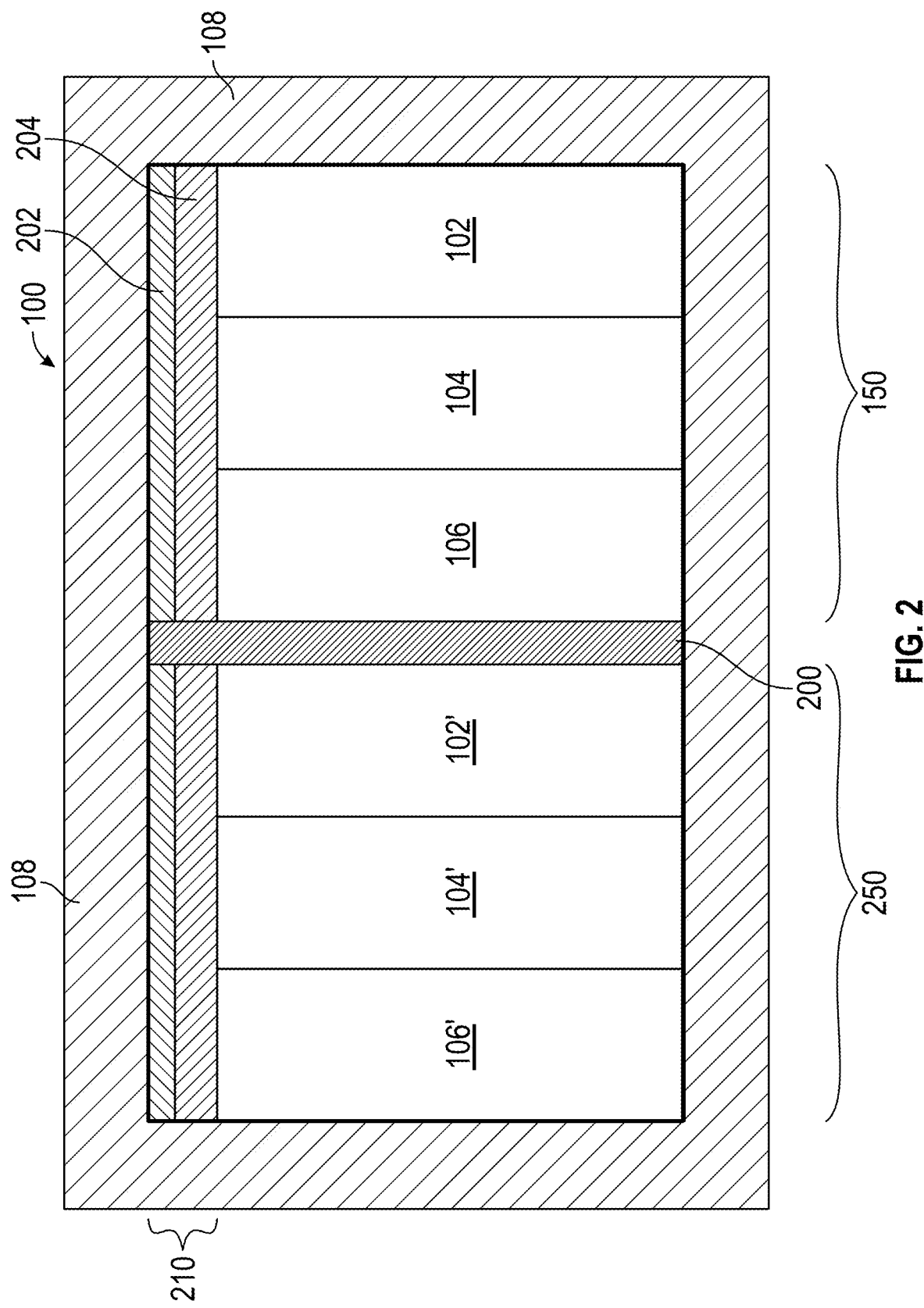
FIG. 2 is an exemplary schematic depiction of the battery module with the flame-retardant composition disposed atop the secondary battery cells.

FIG. 2 depicts the battery module 100 with a first layer 202 (comprising a first composition) and a second layer 204 (comprising a second composition). The second layer 204 comprising the fibrous substrate is disposed atop the first layer 202 that contains the porous particles. In an embodiment, the order of these layers may be reversed with the first layer that contains the porous particles being disposed atop the second layer that comprises the fibrous substrate.

In yet another embodiment (not shown), the flame retardant composition may comprises a plurality of layers of the first composition and the second composition. In other words, the second layer comprising the fibrous substrate is disposed between two first layers that contains the porous particles. Alternatively, the first layer that comprises the porous particles may be disposed between two layers that comprise the fibrous substrate.

The solvent (used to prepare the slurry) may be water, an aqueous solvent (i.e., a solvent that is compatible with water), a water-immiscible solvent, or a combination thereof. Supercritical and/or superheated fluids may also be used as solvents in some compositions. Aqueous solvents are preferred. Liquid carbon dioxide is also preferred. Solvents that can be combined with water to form a co-solvent that can dissolve the salts are desirable.

The solvents may be liquid aprotic polar solvents, polar protic solvents, non-polar solvents, or combinations thereof. Liquid aprotic polar solvents such as propylene carbonate, ethylene carbonate, butyrolactone, acetonitrile, benzonitrile, nitromethane, nitrobenzene, sulfolane, dimethylformamide, N-methylpyrrolidone, or the like, or combinations thereof are generally desirable for dissolving or slurrying the salts and the flame-retardants. Polar protic solvents such as, water, methanol, acetonitrile, nitromethane, ethanol, propanol, isopropanol, butanol, or the like, or combinations thereof may be used. Other non-polar solvents such a benzene, toluene, methylene chloride, carbon tetrachloride, hexane, diethyl ether, tetrahydrofuran, or the like, or combinations thereof may also be used to dissolve or slurry the salts and the flame-retardants. Examples of preferred solvents are water, alcohols, tetrahydrofuran, acetone, or combinations thereof.

In yet another embodiment (not shown), the first composition 202 may be mixed with the second composition 204 after drying and the mixture (of the first composition and the second composition) applied in a single layer to the top of the secondary battery cells.

The flame-retardant composition has a number of advantages. It absorbs combustible gases in the pores of the porous substrate. It converts some of the combustible gases into intumescent carbons that absorb heat during the process of intumescence and slow down the heat transfer. The flame-retardants prevent flammable materials from combusting.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A flame-retardant composition for a battery module comprising:
    a first composition that comprises porous particles upon which are disposed a first metal catalyst particle and a first flame-retardant particle; and
    a second composition that comprises a fibrous composition that comprises a fibrous substrate upon which are disposed a second metal catalyst particle and a second flame-retardant particle; wherein the first composition and the second composition are disposed atop a plurality of battery cells in the battery module.

2. The flame-retardant composition of claim 1, where the first composition and the second composition are blended in an intimate mixture and disposed in the battery module in a single layer.

3. The flame-retardant composition of claim 1, where the first composition is arranged in a first layer and the second composition is arranged in a second layer; where the second layer is further away from the plurality of battery cells than the first layer.

4. The flame-retardant composition of claim 1, where at least one layer that comprises the first composition is disposed between two layers that comprise the second composition.

5. The flame-retardant composition of claim 1, where at least one layer that comprises the second composition is disposed between two layers that comprise the first composition.

6. The flame-retardant composition of claim 1, where the first metal catalyst particle has a same chemical composition as the second metal catalyst particle.

7. The flame-retardant composition of claim 1, where the first metal catalyst particle has a different chemical composition as the second metal catalyst particle.

8. The flame-retardant composition of claim 1, where the first flame-retardant particle has a same chemical composition as the second flame-retardant particle.

9. The flame-retardant composition of claim 1, where the first metal catalyst particle and the second catalyst metal particle each comprise a transition metal.

10. The flame-retardant composition of claim 1, where the first metal catalyst particle and the second catalyst metal particle are independently selected from the group consisting of iron, nickel, cobalt, platinum, palladium, rhodium, tungsten, titanium, niobium, hafnium, vanadium, molybdenum, manganese, or a combination thereof.

11. The flame-retardant composition of claim 1, where the first flame retardant particle and the second flame retardant particle are independently selected from the group consisting of metal hydroxides, metal halides, phosphorus containing flame retardant, nitrogen containing flame retardants and a combination thereof.

12. The flame-retardant composition of claim 11, where the phosphorus containing flame retardant is an organophosphate ester and where the nitrogen containing flame retardant is a melamine.

13. The flame-retardant composition of claim 1, where the porous particle is selected from the group consisting of an aerogel, fumed metal oxides, zeolites, metal organic frameworks, or a combination thereof.

14. A battery module comprising:
a plurality of secondary battery cells arranged side-by-side; and
a flame-retardant composition disposed atop the plurality of secondary battery cells; where the flame-retardant composition comprises a first layer upon which is disposed a second layer; where the first layer comprises a first composition and where the second layer comprises a second composition; where the first composition comprises porous particles upon which are disposed a first metal catalyst particle and a first flame-retardant particle; and where the second composition comprises a fibrous composition that comprises a fibrous substrate upon which are disposed a second metal catalyst particle and a second flame-retardant particle.

15. The battery module of claim 14, where the first metal catalyst particle has a same chemical composition as the second metal catalyst particle.

16. The battery module of claim 14, where the first metal catalyst particle has a different chemical composition as the second metal catalyst particle.

17. The battery module of claim 14, where the first flame-retardant particle has a same chemical composition as the second flame-retardant particle.

18. The battery module of claim 14, where the first metal catalyst particle and the second catalyst metal particle comprises a transition metal particle.

19. The battery module of claim 14, where the porous particle is selected from the group consisting of an aerogel, fumed metal oxides, zeolites, metal organic frameworks, or a combination thereof.

20. The battery module of claim 14, where the flame retardant composition is derived from a slurry that comprises a metal catalyst particle, a flame retardant particle, a fibrous substrate, porous particles and a polymeric binder; and wherein the slurry can be cast into the module to fill in available free space in the module.

* * * * *